Oct. 28, 1969  V. P. CAPPELLO  3,474,799
DENTAL FLOSS HOLDER
Filed June 8, 1966  2 Sheets-Sheet 1

INVENTOR.
VITO P. CAPPELLO
BY Elliott & Pastoriza
ATTORNEYS

Oct. 28, 1969    V. P. CAPPELLO    3,474,799
DENTAL FLOSS HOLDER

Filed June 8, 1966    2 Sheets-Sheet 2

INVENTOR.
VITO P. CAPPELLO
BY
*Elliott & Pastoriza*
ATTORNEYS

United States Patent Office 3,474,799
Patented Oct. 28, 1969

3,474,799
DENTAL FLOSS HOLDER
Vito P. Cappello, 1047 Franklin St.,
Santa Monica, Calif. 90403
Continuation-in-part of application Ser. No. 305,432,
Aug. 29, 1963. This application June 8, 1966, Ser.
No. 560,371
Int. Cl. A61c 15/00
U.S. Cl. 132—91                                      1 Claim

ABSTRACT OF THE DISCLOSURE

A dental floss holder provided with conical cavities at the outer ends of a forked structure. A given length of dental floss with conical projections secured to each end to be manually inserted into the forked structure by positioning the conical projections in the conical cavities.

---

This application is a continuation in part of my co-pending application Ser. No. 305,432 filed Aug. 29, 1963, now abandoned and entitled Dental Floss Holder.

This invention relates generally to teeth cleaning aids and more particularly to an improved holder for dental floss to facilitate cleaning between adjacent teeth.

Holders for dental floss are well known in the art and generally include a fork structure between which a piece of dental floss is secured. The user may then conveniently urge the dental floss between adjacent teeth.

Many of the foregoing types of devices employ the relatively complicated means for securing the ends of the dental floss to the head or handle structure supporting the fork tines. Any working loose of the securement means will result in slack appearing in the dental floss portion extending between the ends of the fork tines, and as a consequence it is difficult to work the dental floss between the adjacent teeth, particularly when the teeth are relatively close together. Moreover, after extended use with many of these prior art devices, the dental floss may become loose between the fork tines.

The foregoing problems can be further aggravated when spools of dental floss are incorporated in the handle and an end portion thereof brought along parallel to the longitudinal axis of the handle and then stretched between the fork tines. In other words, where a relatively long length of dental floss exists between its secured portions, stretching of the dental floss can result in slack appearing at the working portion of the floss between the tines.

In addition, insertion of the dental floss in many prior art devices often necessitates handling of the useable portion of the floss, which can result in unsanitary conditions.

With the above in mind, it is accordingly a primary object of this invention to provide a greatly improved dental floss holder in which the foregoing problems are overcome.

More particularly, it is an object to provide a dental floss holder in which a piece of dental floss is at all times, and even after repeated use, maintained under a high tension between fork tines or equivalent structure to which it is secured to the end that better efficiency in the use of the device is realized.

Another important object is to provide a novel dental floss holder so designed that urging of the dental floss between adjacent teeth may be effected by opposing teeth, in the event manual insertion is difficult.

Another object is to provide a dental floss holder so designed that the floss will avoid initial engagement with the apex of the interdental papilla.

Yet another object is to provide a dental floss holder together with a dental floss segment wherein the floss may be inserted without having to handle the useable portion of the floss so that sanitary conditions are maintained.

Still another object is to provide a dental floss holder which is attractive in appearance, easy to use, may be manufactured relatively inexpensively, and in which there is provided cooperating guide means for facilitating substitution of new dental floss pieces for used pieces.

Briefly, these and many other objects and advantages of this invention are attained by providing an elongated handle structure. A head is integrally formed at one end of this handle and includes two downwardly depending arms defining a fork structure. The end portions of these arms include novel individual securing means for a piece of dental floss of given length.

In the preferred embodiment of this invention, the arms are resilient and diverge from each other in a downward direction. By this arrangement, the arms must be biased together in order to insert the piece of dental floss of given length so that when the arms are released the dental floss is placed under tension.

In accordance with another feature of the invention, a top surface portion of the head is flat and directly vertically aligned above the end portions of the arms. With this arrangement, a person may use his teeth opposing the adjacent teeth between which the dental floss is inserted for urging the dental floss between the adjacent teeth.

A guide means may also be provided for cooperation with the holder. This guide means includes spaced members having converging surfaces adapted to receive the arms of the holder to urge the same together and thus facilitate insertion of the dental floss. The arms may be made relatively stiff and yet be easily biased together by the guide means so that a high tension is maintained on the dental floss after release from the guide means.

A better understanding of the invention will now be had by referring to a preferred embodiment thereof as illustrated by the accompanying drawings, in which.

Referring to FIGURES 1 to 4, the dental floss holder comprises an elongated handle 10. A head 11 is integrally formed at one end of the handle and includes downwardly directed arms 12 and 13. As shown most clearly in FIGURES 3 and 4, these downwardly extending arms diverge as indicated by the letter D in a downward direction so that the ends of the arms are spaced further apart than their connecting portions to the top part of the head.

Figure 1:
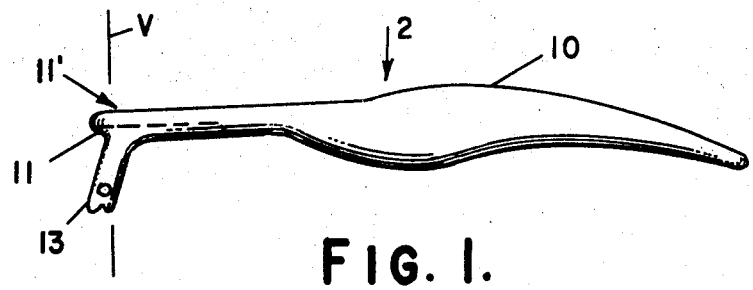
FIGURE 1 is a side view of the improved dental floss holder of this invention.
Figure 2:
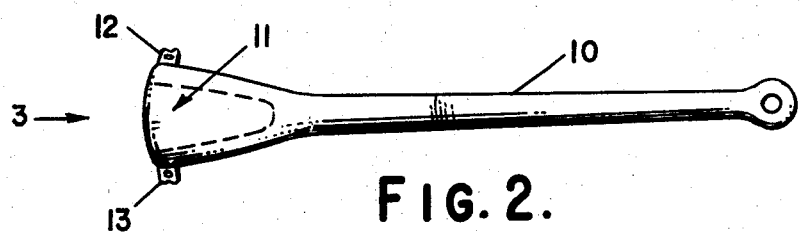
FIGURE 2 is a top plan view looking in the direction of the arrow 2 of FIGURE 1.
Figure 3:
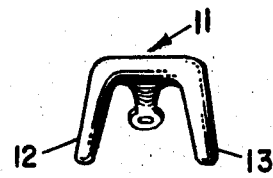
FIGURE 3 is a front elevational view looking in the direction of the arrow 3 of FIGURE 2.
Figure 4:
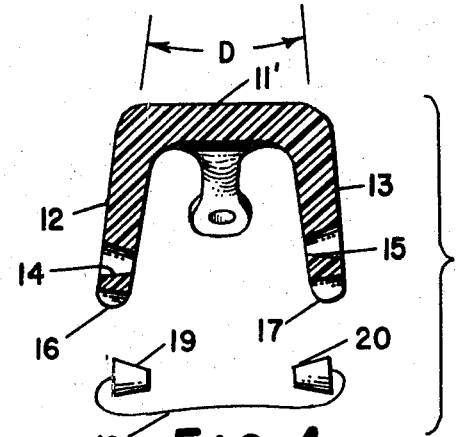
FIGURE 4 is an enlarged cross section of the head portion showing in full lines a piece of dental floss designed in accordance with this invention, prior to the insertion in the head structure.

With particular reference to FIGURE 4, securing means in the form of conically shaped cavities 14 and 15 are formed in the lower exterior ends of the arms 12 and 13. At the extreme ends of the arms there are provided slots 16 and 17. The slot 17 is made somewhat deeper than the slot 16.

Also illustrated in FIGURE 4, is a piece of dental floss 18 terminating in conical end projections 19 and 20. These conical projections 19 and 20 are arranged to be received in the conical cavities 14 and 15. However, the length of the portion of the dental floss 18 extending between the arms when secured to the arm ends is less than the distance between the arm ends prior to insertion of the dental floss. Accordingly, it is necessary to bias the arm ends together to enable insertion of the conical projections 19 and 20. This biasing may be effected by means of the unique design of the conical cavities and projections as will be described subsequently. When the floss has been inserted and the arms released, the dental floss 18 will then be placed in tension.

Figure 5:
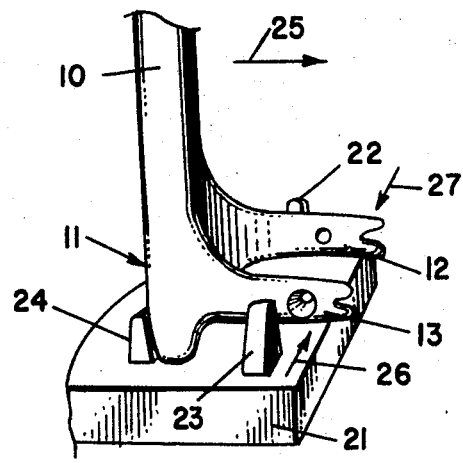
FIGURE 5 is a fragmentary view illustrating a guide structure designed for cooperation with the holder to facilitate insertion of a piece of dental floss.

One manner of urging the arms 12 and 13 together to insert the dental floss, is illustrated in FIGURE 5 wherein there is shown a guide structure 21 including spaced, upwardly directed guide members 22 and 23 having converging interior opposing surfaces. The structure 21 may also include a heel projection 24.

In order to insert the piece of dental floss by this means, the head 11 of the dental floss holder is positioned with its front top portion against the heel 24 and the arms 12 and 13 are urged downwardly between the projecting members 22 and 23. Because of the converging interior surfaces of the members 22 and 23, the arms 12 and 13 are biased together and it is then a simple matter for a person to insert the conical projections 19 and 20 in the conical cavities in the arms.

Figure 6:
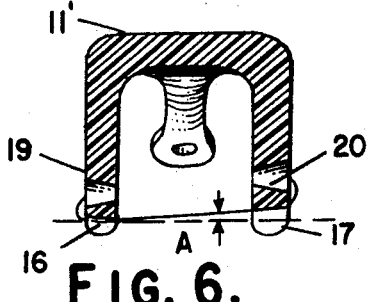
FIGURE 6 is a cross section of the head of the dental floss holder with a piece of dental floss, shown in full lines, inserted therein.

The completed assembly is illustrated in FIGURE 6. As shown, the dental floss 18 is angulated as a consequence of the slot 17 being somewhat deeper than the slot 16. This construction is desirable as it will facilitate working of the dental floss between the adjacent teeth and avoid direct engagement with the apex of the interdental papilla.

In accord with another important feature of this invention, the head 11 is provided with a flat surface portion 11' as shown best in FIGURES 4 and 6. By providing this flat surface portion, a person may employ certain of his teeth opposing the adjacent teeth between which the dental floss is to be urged for applying a downward force on the head 11. For maximum effect, the flat surface portion 11' is disposed vertically above the ends of the arms 12 and 13, as indicated by the vertical dashed line V in FIGURE 1.

The operation of the dental floss holder of FIGURES 1 to 6 will be evident from the foregoing description. Initially, the user will remove a piece of dental floss from any suitable container. Each piece of dental floss terminates in the conical projections 19 and 20 illustrated in FIGURE 4. The ends of the dental floss itself are rigidly secured to these conical projections in their manufacture.

The user may then urge the arms 12 and 13 between the guide members 22 and 23 of the structure as illustrated in FIGURE 5 to bias the arms together. One projection such as 19 may then be inserted in the corresponding conical cavity 14 and the dental floss then passed about slot 16, and across through the other slot 17, and the other projection 20 then inserted in the conical cavity 15. After the dental floss has been inserted, the user may release the arms from the members 22 and 23 on the guide structure 21 so that the arms will tend to resiliently move toward their diverging positions thereby placing the dental floss 18 under considerable tension. This tension will always be maintained. Any slight stretching of the dental floss portion between the arms will be immediately taken up by the tendency of the arms to move toward their diverged position.

After a piece of dental floss has been used a number of times and is no longer effective for cleaning between the teeth, the user may remove the dental floss by again urging the arms 12 and 13 between the members 22 and 23 to loosen the dental floss and enable easy removal. A new dental floss may then be inserted as described.

A particular advantage of the foregoing construction is the fact that the ends of the dental floss are secured immediately adjacent to the ends of the arms so that there are no long portions of dental floss which might stretch and thus result in loosening of the portions of dental floss between the arm ends. Moreover, the feature of the flat surface portion on the head being disposed vertically above the ends of the arms greatly facilitates the use of the device in that opposing teeth may be employed to urge the dental floss between adjacent teeth.

Figure 7:
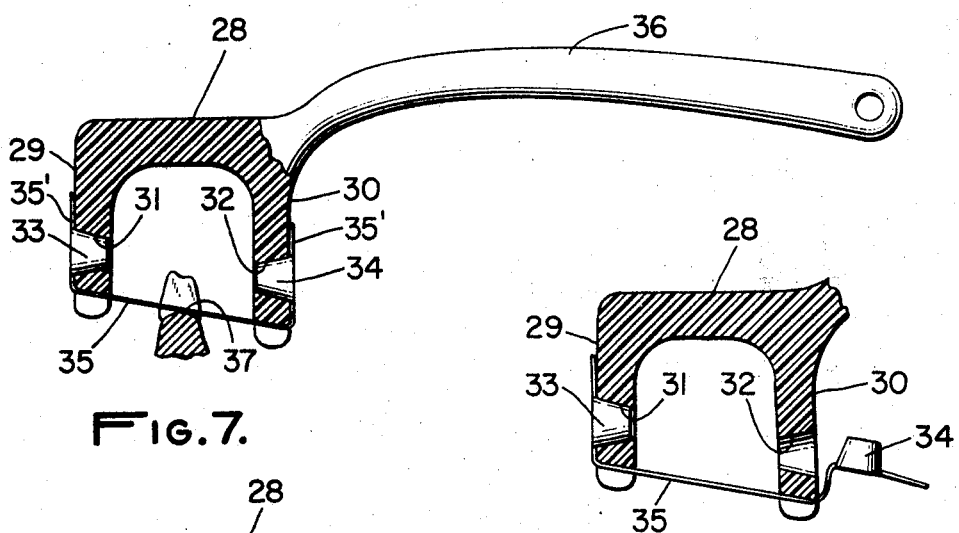
FIGURE 7 is an elevational view partly broken away showing a modified embodiment of the holder.

Referring now to FIGURE 7, there is shown a modified dental floss holder comprising a head structure 28 having downwardly depending arms 29 and 30. In this embodiment, the arm 30 is made longer than the arm 29. These arms each include conical cavities 31 and 32 for receiving suitable conical plugs 33 and 34 on the ends of a given length of dental floss 35. The effect of providing a longer arm 30 relative to the arm 29 results in an inclination of the dental floss 35 and in this respect serves the same function as providing a deeper slot as described in conjunction with FIGURE 6.

In the embodiment of FIGURE 7, the head 28 merges into an integrally formed elongated handle 36 which lies in the plane of the arms 29 and 30. With this handle arrangement, as opposed to the handle arrangement shown in FIGURES 1 to 6, it is possible for the user to grip the holder considerably closer to the arms 29 and 30 and facilitates his removing the dental floss from between adjacent teeth.

An advantage in the inclination of the dental floss itself as shown at 35 is that the same may be caused to engage a side portion 37 of the interdental papilla which portion is stronger than the more tender apex portion.

It will be noted in FIGURE 7 that the conical projections 33 and 34 are secured to the dental floss 35 adjacent to the ends of the floss to leave small extended free ends of floss as at 35'. This arrangement facilitates manufacture of the dental floss with the conical projections as will become clearer as the description proceeds. In addition the small free ends facilitate handling of the floss without touching the useable portion between the projections as will also become clearer as the description proceeds.

Figure 8:
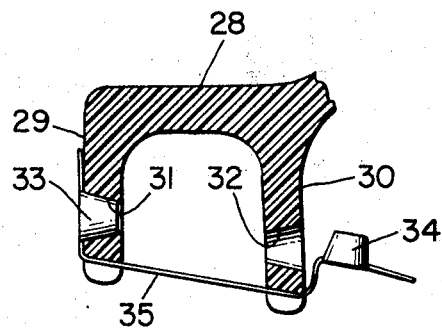
FIGURES 8, 9 and 10 are cross sections of the head portion of the holder of FIGURE 7 illustrating successive steps involved in inserting a piece of dental floss.
Figure 9:
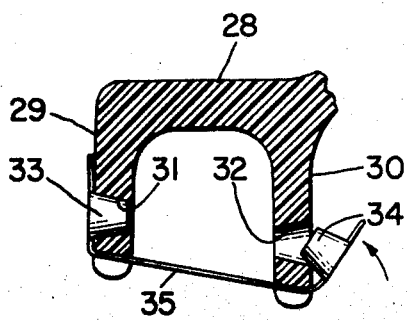
Figure 10:
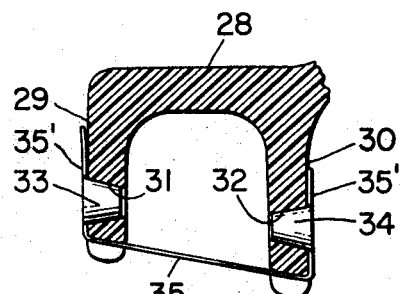

Referring now to FIGURES 8, 9 and 10, a second manner of inserting the dental floss wherein the guide means of FIGURE 5 is not used will be described. It should be understood that the showing in FIGURES 8, 9 and 10 and the manner in which the dental floss is inserted is also applicable to the insertion of the dental floss in the structure of FIGURES 4 and 6 as an alternative to the use of the guide means.

Referring first to FIGURE 8, in inserting a segment of the dental floss 35, the plug 33 is initially inserted in the conical cavity 31 as shown. This operation may be carried out without the user having to handle any of the major portion of the dental floss 35 between the plugs.

With one finger holding the plug 33 in the conical cavity 31, the user, by holding the other conical plug 34, may very easily guide the floss 35 in the end slots of the arms to the position illustrated in FIGURE 8.

Next, the user will cause the lower conical edge of the plug 34 to engage the lower conical upwardly and inwardly sloping surface portion of the cavity 32. This initial positioning is illustrated in FIGURE 9. In this position, there will already be a slight tension on the dental floss 35.

Finally, the user will then press the conical plug 34 completely into the cavity 32. The cooperating conical surfaces provide a camming action which will result in a desired tension in the floss 35. This desired tension is thus effected without the necessity of the guide means, the camming surfaces of the plug and cavity cooperating together to effect the biasing of the lower ends of the arms towards each other to result in proper tension when the projection has been fully inserted.

It should be noted with respect to the foregoing description, that the floss may be inserted without the user having to handle the active portion 35 between the plugs, it only being necessary that the plugs themselves and free ends 35' be handled to insert the same.

The foregoing arrangement provides considerable advantages over conventional knots in that there is no possibility of slipping as can occur with a knot.

The dental floss may readily be removed by simply pulling on one of the free ends 35' to unseat the projection so that the projection will then pop out.

Figure 11:
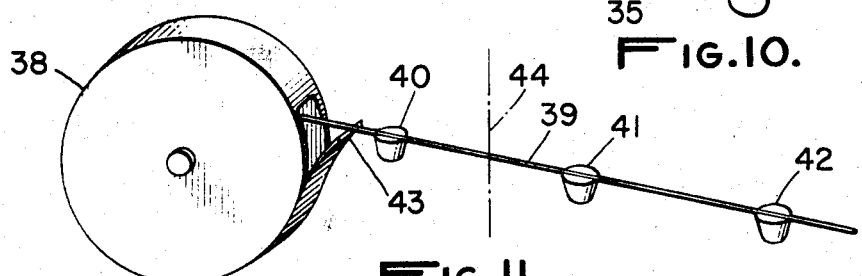
FIGURE 11 is a perspective view of a container for storing dental floss for use with the holder of this invention; and, FIGURE 12 is a cross section of the head portion of a further modified type of holder in accordance with this invention.

Referring now to FIGURE 11, there is shown a circular pillbox container 38 which may be provided for the modified type of dental floss shown in FIGURES 7 to 10 but also usable with the holder described in FIGURES 1 to 6. As shown, there is provided a continuous piece of dental floss 39 with conically shaped plugs 40, 41, and 42 secured to the floss by imbedding the floss along a diametric channel in the head of each conical projection. The container 38 itself may include a suitable cutting knife 43.

In operation, the user need simply pull a suitable length of dental floss from the container by holding an end of the floss and then severing the floss between two adjacent plugs such as between the two adjacent plugs 40 and 41 as indicated by the dashed line 44. There is then provided a section of floss between the plugs 41 and 42 ready for insertion in the holder. By this arrangement, there is provided a very neat packaging for the dental floss.

Figure 12:
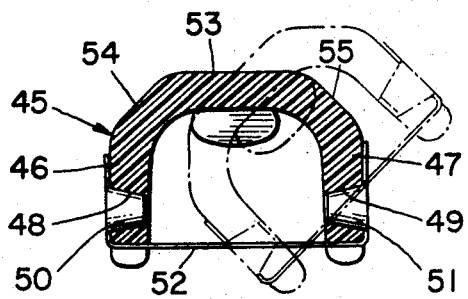

Referring now to FIGURE 12 there is shown one additional modification of the dental floss holder wherein there is provided a symmetrically shaped head 45 having downward arms 46 and 47 of equal length and suitable conical cavities 48 and 49 positioned at identical levels. With this head, end plugs 50 and 51 at the ends of a piece of dental floss 52 may be inserted into the conical cavities 48 and 49 as described with respect to FIGURES 8, 9 and 10. The dental floss 52 will be level and thus parallel to a central top surface portion 53 of the head 45. This surface 53 corresponds to the surface 11' in that it is flat and the user may engage this top surface with his upper teeth in forcing the dental floss 50 between lower teeth, and vice versa.

In the embodiment of FIGURE 12 however, the top surface also includes further downwardly sloping flat portions 54 and 55. With these additional surfaces, the user may tilt or rotate the head slightly such as indicated by the dotted line position so that the floss 52 will be angulated and he may then employ his opposing teeth on the surface 55 or, if the holder is oriented in the other direction, on the surface 54. With this arrangement, the dental floss 52 may be caused to engage adjacent the base portions of the teeth adjacent the crown of the gingival area as illustrated in FIGURE 7.

From the foregoing description, it will be evident that the present invention has provided a greatly improved dental floss holder as well as dental floss construction itself. The unique dental floss structure wherein conical plugs are provided will enable a user to actually clean his teeth with the dental floss by holding on to the plugs themselves in the event that the dental floss holder is not used. Thus, the dental floss itself with its unique conical plugs has utility. In this respect, the normal manner of using dental floss involves wrapping the dental floss around the user's fingers in order to obtain a thorough grip thereon. Thus, a considerable portion of the dental floss is wasted. With the new dental floss construction described in FIGURE 11, there is a minimum length of dental floss necessary to effect maximum cleaning, the plugs themselves serving as convenient holding means in the event the holder is not used.

It will be evident accordingly that a greatly improved dental floss holder has been provided by the present invention. While only particular embodiments have been set forth and described, various changes that fall clearly within the scope of this invention will occur to those skilled in the art. The dental floss holder is therefore not to be thought of as limited to the specific constructions set forth merely for illustrative purposes.

What is claimed is:
1. A dental floss holder comprising, in combination: a head including two downwardly directed arms defining a fork structure and including conically shaped cavities formed in the lower exterior side portions of said arms, the larger diameter openings of said cavities facing exteriorly of said arms in opposite directions from each other so that said conical cavities define inwardly and upwardly directed surfaces at their lower portions; a piece of dental floss of given length; conically shaped solid projections of dimensions to be received in mating engagement within said cavities secured to end portions of said dental floss, the portion of dental floss extending between the ends of said arms when said conical projections are received in said cavities being shorter than the distance between the ends of said arms prior to insertion of said conical projections whereby one of said conically shaped projections may be initially inserted in one of said conically shaped cavities, the other of said conically shaped projections being positionable with its lower conical edge engaging the lower inwardly and upwardly directed surface of the other of said conically shaped cavities so that urging thereof into said cavity results in a camming action to stretch said dental floss with a given tension after said conical projections have been received in mating engagement within said cavities.

References Cited
UNITED STATES PATENTS

| | | | |
|---|---|---|---|
| D. 187,132 | 2/1960 | Griffin | D24—1 |
| 1,815,408 | 7/1931 | Jordan | 132—91 |
| 1,882,204 | 10/1932 | Zrna | 132—91 |
| 2,180,522 | 11/1939 | Henne | 132—91 |
| 2,607,358 | 8/1952 | Maas | 132—92 |

LOUIS G. MANCENE, Primary Examiner

G. E. McNEILL, Assistant Examiner